United States Patent

[11] 3,617,838

| | | |
|---|---|---|
| [72] | Inventor | Armand Brandt<br>Luzern, Switzerland |
| [21] | Appl. No. | 5,172 |
| [22] | Filed | Jan. 23, 1970 |
| [45] | Patented | Nov. 2, 1971 |
| [73] | Assignee | Aktiengesellschaft Brown, Boveri & Cie<br>Baden, Switzerland |
| [32] | Priority | Jan. 28, 1969 |
| [33] | | Switzerland |
| [31] | | 1,487/69 |

[54] ARRANGEMENT FOR STEPLESS SPEED REGULATION OF A MOTOR FED WITH CURRENT FROM A CONVERTER
4 Claims, 12 Drawing Figs.

[52] U.S. Cl. .................................................... 318/225 R,
318/227, 318/231
[51] Int. Cl. ..................................................... H02p 5/28
[50] Field of Search ......................................... 318/225,
227, 231

[56] References Cited
UNITED STATES PATENTS

| | | | |
|---|---|---|---|
| 2,896,143 | 7/1959 | Bekey ......................... | 318/231 X |
| 3,345,549 | 10/1967 | Hauser et al. .................. | 318/231 X |
| 3,387,196 | 6/1968 | Graham et al. ................. | 318/227 |
| 3,506,899 | 4/1970 | Graham ......................... | 318/227 |

*Primary Examiner*—Gene Z. Rubinson
*Attorney*—Pierce, Scheffler and Parker

ABSTRACT: A converter motor which provides a stepless variable speed control includes a pair of stator elements surrounding a common rotor which may be of the squirrel cage type. Each stator of the motor is provided with at least two open three-phase winding systems supplied from a three-phase mains and which are connected periodically with cyclically interchanged phase sequence by way of a controllable valve group to form a star point. The individual valve groups are controlled periodically with a frequency $f2$ which is different from the mains frequency $f1$ supplying the three-phase windings so that the star points of the three-phase stator winding systems are periodically closed and opened to thus establish a rotary stator field which rotates with a frequency equal to $f2-f1$ and which reacts with the rotor to drive the rotor at the rotational frequency of the stator field.

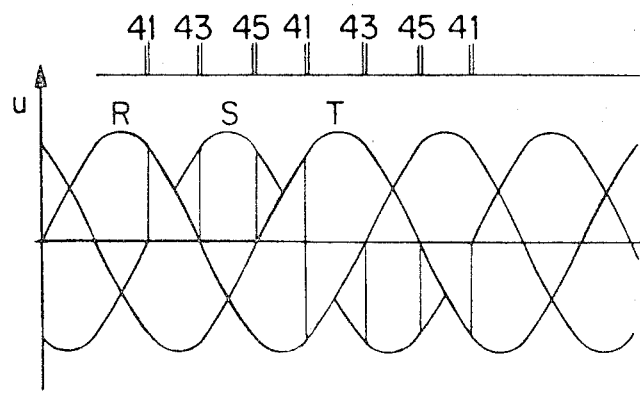
Fig. 3a
Fig. 3b
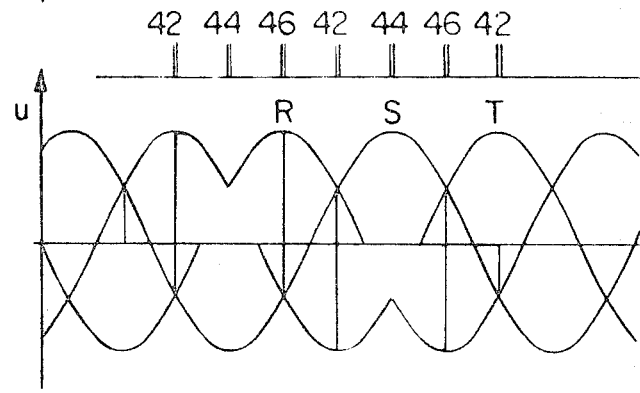
Fig. 3c
Fig. 3d
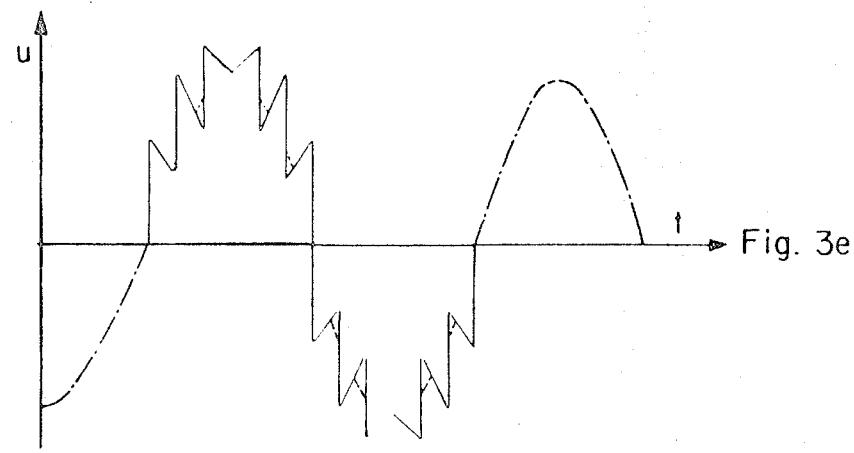
Fig. 3e

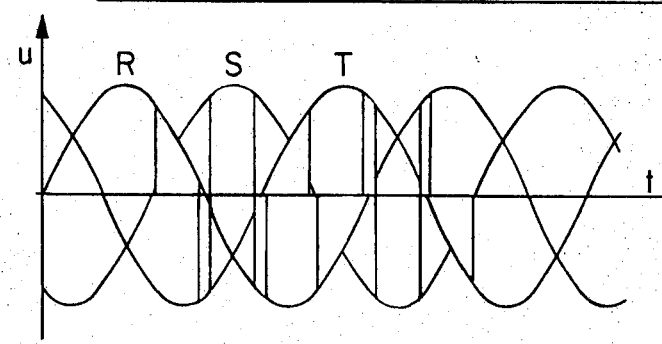
Fig. 4a
Fig. 4b
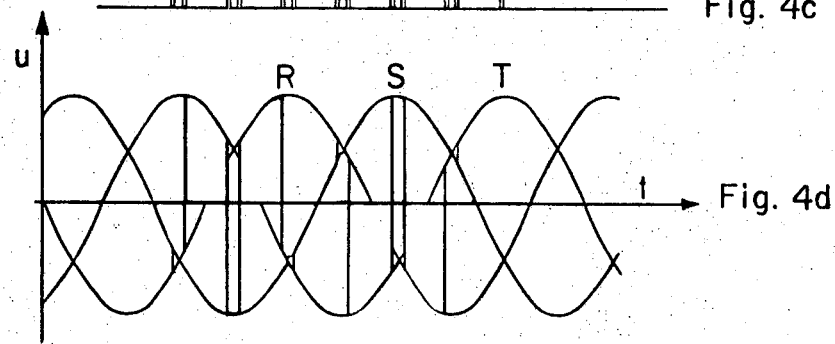
Fig. 4c
Fig. 4d
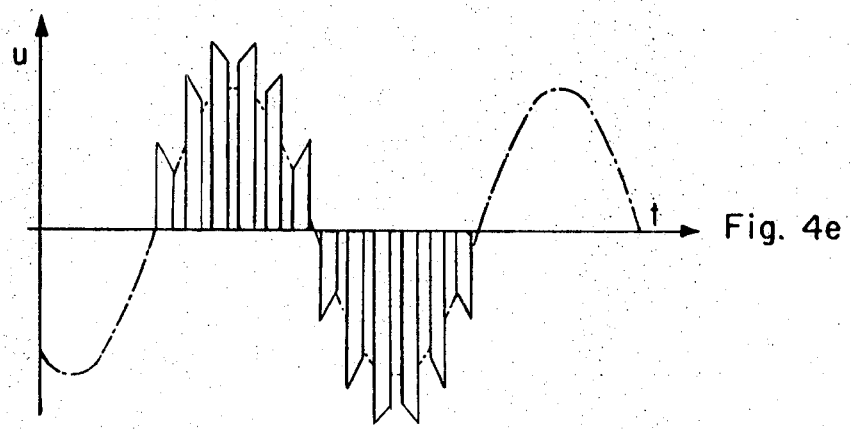
Fig. 4e

ARRANGEMENT FOR STEPLESS SPEED REGULATION OF A MOTOR FED WITH CURRENT FROM A CONVERTER

It is known to control the speed of three-phase motors by feeding with variable frequency current. To this end are used static frequency transformers, preferably inverter circuits with intermediate DC circuit, that is circuits where three-phase current is first rectified and the resulting DC voltage is converted in a second stage over a self-guided inverted converter to the phase current of the desired frequency. In these circuits the motor and converter represent separate parts of the plant. In addition, circuits are known where the motor and converter form an inseparable unit. These units, called converter motors, where the converter valves take over the role of the commutator, require a great number of controllable valves (thyristors) particularly if they are to be used as reversing drives, connected with a relatively complicated control for these valves.

The object of the present invention is to provide a converter motor for infinitely variable i.e. stepless speed control which has a smaller number of controllable valves and hence a lower control expenditure. According to the invention the improved converter motor is characterized in that the stator of the motor carries several open three-phase winding systems which are connected periodically with cyclically interchanged phase sequence with the three phases of each winding system over a controllable valve group to form a star point, and that the individual valve groups are controlled periodically with a control frequency $f2$ which is different from the mains frequency $f1$, so that the star points of the three-phase current systems are closed periodically in succession and opened again, so that a rotary stator field is formed which rotates with the frequency $f2-f1$ and which entrains the rotor.

Each valve group consists preferably of a diode three-phase bridge and of a thyristor short-circuiting the DC circuit of this diode bridge.

In order that the motor can be operated with constant current flow, independent of the adjusted frequency, the motor is divided into two stators, each covered with several three-phase winding systems, which work on a common rotor so that the voltages induced by the two stators add up in the rotor conductors. The common rotor can be designed as a squirrel cage motor. The valve groups of one stator are controlled preferably phase-shifted with respect to the valve groups of the other stator. The harmonic content of the rotor current is thus substantially reduced.

The novel circuit hereinafter described is characterized by a particularly small number of thyristors, as compared to the known circuit arrangements. The new circuit which requires only six thyristors operates with mains feedback both as a motor and as a generator. The electrical machine operates as a generator as soon as the rotor turns faster than the rotary field of the stator. Switchings in the control or in the main circuit are not necessary. The reversal of the direction of rotation of the motor is effected without any special measures as soon as the control frequency has been reduced to lower values than the mains frequency. In addition, the circuit requires no wattless control power of the mains frequency, that is, the mains power factor corresponds in all operating states practically to the power factor of an asynchronous motor operated under the same conditions (same frequency and same voltage).

One practical embodiment of the invention will now be described in detail and is illustrated in the accompanying drawings wherein:

FIGS. 3a–3e show the standstill voltages at maximum voltage ground surge induced by the two stators in the rotor; and FIGS. 4a–4e show the standstill voltages with back-regulated voltage ground surge induced by the two stators in the rotor.

In FIGS. 3a–3e and 4a–4e:
a. denotes the control impulse sequence for the thyristors belonging to stator 11.
b. denotes the induced standstill voltage originating from stator 11.
c. denotes the control impulse sequence for the thyristors belonging to stator 12.
d. denotes the induced standstill voltage originating from stator 12.
e. denotes the resulting induced standstill voltage in the rotor.

Figure 1:
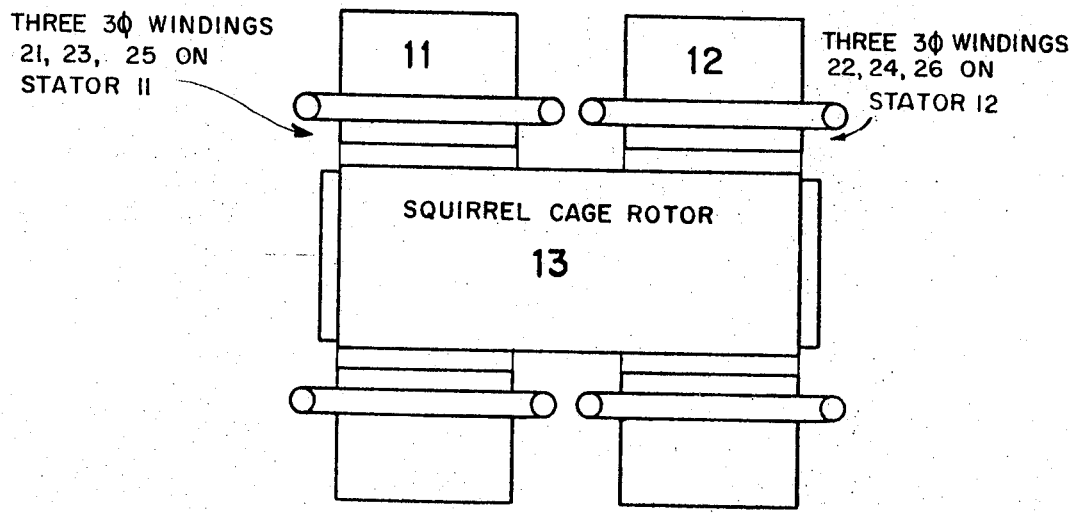
FIG. 1 shows the schematic arrangement of a double stator model.
Figure 2:
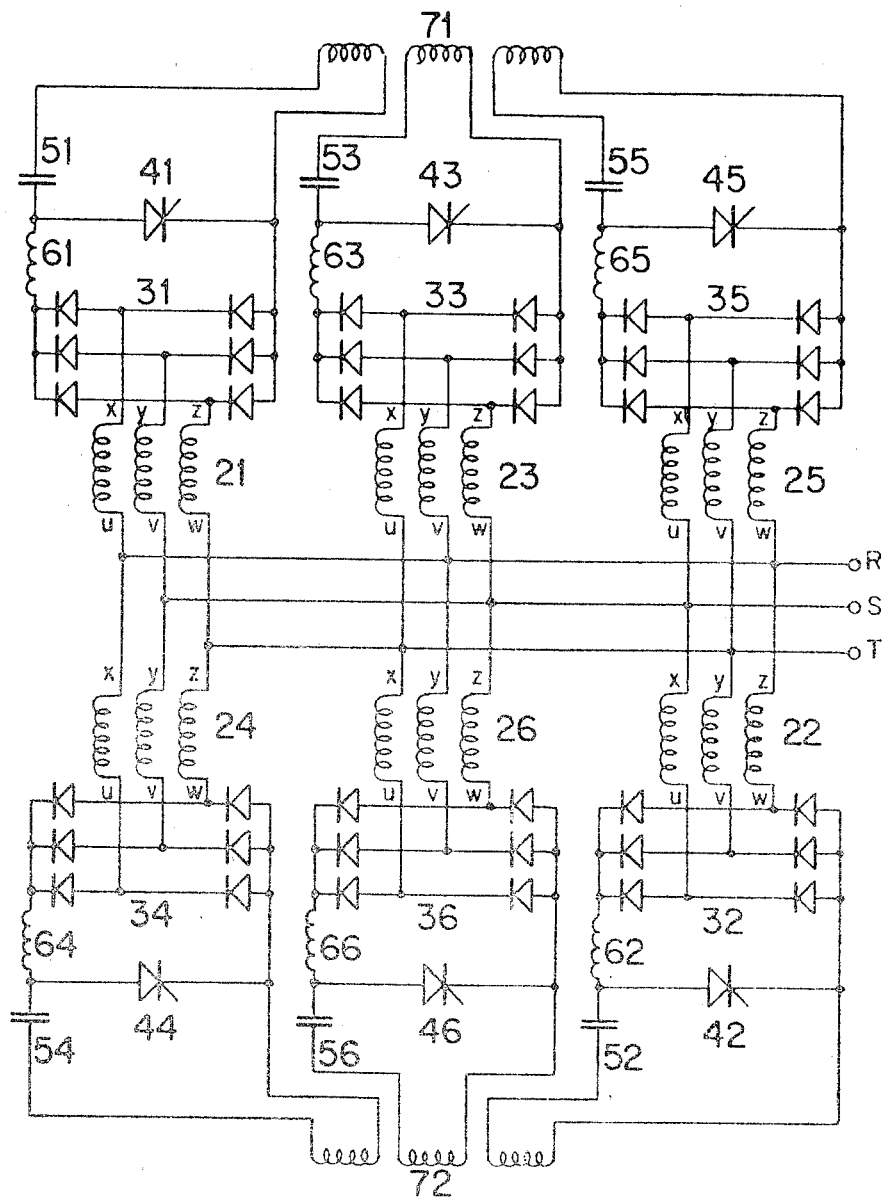
FIG. 2 shows the circuit of the motor windings of the two stators with the valve groups.

The converter motor represented schematically in FIG. 1 consists of two stators 11 and 12, in the bores of which rotates a common squirrel cage rotor 13. Each stator carries three separate three-phase winding systems which are designated in the circuit diagram FIG. 2 of the converter motor with 21, 23, 25 for one stator, and with 22, 24, 26 for the other stator. The corresponding phases of the three-phase current systems are arranged in the same or in adjoining slots of the stator in such a way that, with inphase feed of the three three-phase systems with three-phase current, inphase rotary fields are formed. The two stators are so arranged that the resulting rotary fields of the two stators rotate with the same speed in the same direction. The coil ends $x$, $y$, $z$ of the three-phase systems 21, 23, 25 are connected over three-phase diode bridges 31, 33, 35 which have each a thyristor 41, 43, 45 in the DC circuit, to a star point. The coil heads, $u$, $v$, $w$ of the three-phase systems 21, 23 25 are connected with cyclically interchanged phase sequence with the three phases R, S, T of the feeding mains. In the three systems 22, 24, 26 of the second stator the coil heads $u$, $v$, $w$ are connected with corresponding diode bridges 32, 34, 36 and thyristors 42, 44, 46 while the coil ends $x$, $y$, $z$ are connected with the mains phases R, S, T, likewise with cyclically interchanged phase sequence. The star points of the three systems 21, 23, 25 are closed and opened periodically in succession with the frequency $f2$, which is different from the mains frequency $f1$ of the feeding three-phase mains. In the stator 11 is thus formed a rotary field which rotates with the differential frequency $f2-f1$.

A similar rotary field is obtained in the stator 12 if the star points of the systems 22, 24, 26 are formed periodically with the frequency $f2$. The three-phase systems 21, 23, 25 with the thyristors 41, 43, 45 form a commutation group. During the ignition of one of these thyristors the previously conductive thyristor is forcibly quenched by condenser discharge. The quenching device for this commutation group consists of the condensers 51, 53, 55 and of the commutation transformer 71 which couples the three quenching circuits with each other. The blocking chokes 61, 63, 65 have the function of imparting to the quenching thyristor a negative blocking voltage during its release time so that the thyristor can achieve again its blocking capacity in this period. The commutation process takes place as follows: When the thyristor 41 is considered conductive, the diode bridge 31 is short-circuited and the star point of the three-phase system 21 is formed. The condenser 51 is uncharged at this moment, while the condensers 53 and 55 are charged from the mains over the diode bridges 33 and 35. If the thyristor 43 is now ignited, condenser 53 discharges over thyristor 43 and commutation transformer 71. This discharge current induces in the quenching circuit of thyristor 41 a current which flows over the thyristor in blocking direction and charges the condenser 51 positively. This induced current brings the load current in thyristor 41 to 0 and quenches thus the thyristor. As soon as thyristor 41 blocks, the induced current impulse flows over the diode bridge 31 and the blocking choke 61 into condenser 51 and charges the latter further. Over the blocking choke 61 is formed a voltage drop which remains over the quenched thyristor as a blocking voltage. After the commutation is completed, thyristor 43 carries the full load current. The three-phase system 23 is thus current-carrying and forms a rotary field. The current commutation to the three-phase system 25 is effected in a similar manner and the commutation of the three-phase system 25 to the system 21 likewise. The three-phase systems 22, 24, 26 of stator 12 form a second commutation group which is independent of the first one. The current commutation from one three-phase system to the following system is effected by means of the quenching condensers 52, 54, 56 and the commutation transformer 72 in the same manner as for the upper commutation group. The blocking chokes in this commutation group are 62, 64 and 66. The two commutation groups are controlled phase-shifted so that the two groups do not commutate simultaneously. The voltage induced by the three-phase systems 21, 23, 25 at standstill in the rotor of the converter motor has the course represented in FIG. 3$b$. The voltage diagram represented for a control frequency $f2=2 \cdot f1$ is composed of voltage segments of the three mains phases R, S, T. It corresponds to the voltage which is induced by the motor winding $u$–$x$ of the systems 21, 23, 25 in the rotor. The motor windings $v$–$y$ induce a similar voltage in the rotor phase-shifted by 120°, the motor windings $w$–$z$ a similar voltage phase-shifted by 240°. The order and the frequency with which the thyristors are ignited are indicated in FIG. 3$a$ by the numbers 41, 42, 45 corresponding to the designation of the thyristors. FIG. 3$d$ shows the voltage which is induced in the rotor at standstill by the motor windings $u$–$x$ of the systems 22, 24, 26. According to FIG. 3$c$ the phase position of the control impulses for the thyristors 42, 44, 46 is phase-shifted with respect to the control impulses for the thyristors 41, 43, 45. The induced voltage in FIG. 3$d$ has therefore a somewhat different form than the voltage according to FIG. 3$b$, but the same phase-position. The induced standstill voltage of the rotor resulting from the superposition of FIGS. 3$b$ and 3$d$ is shown in FIG. 3$e$. This voltage is determinant for the rotor current and thus for the torque of the motor. In order to adapt the induced voltage to the frequency and to obtain respectively a stator current flow independent of the frequency, the thyristors are so controlled that thyristors of systems of the two stators opposing each other in FIG. 2, for example thyristors 41 and 44, are conductive temporarily at the same time; then thyristors 53 and 46, and thyristors 45 and 42 respectively become at the same time conductive. FIGS. 4$a$ and 4$c$ show the necessary control impulse sequence for the commutation groups and FIGS. 4$b$ and 4$d$ show the standstill voltages induced by the two stators in the rotor. FIG. 4$e$ shows the resultant standstill voltages which have voltage gaps, compared to FIG. 3$e$, and thus a smaller fundamental wave amplitude. By displacing the small control impulses in FIGS. 4$a$ and 4$c$ relative to the large control impulses, the voltage gaps and thus the fundamental wave amplitudes can be constantly changed and adapted to the motor frequency.

The motor frequency can be adjusted infinitely down to zero. At a motor frequency of 0, the thyristors must be controlled with the frequency of $f2=f1$. The motor frequency can be increased from 0 beyond the mains frequency so that the motor can also be operated with speeds which are above the synchronous speed of, for example, 50 cycles. If the control frequency $f2$ is selected less than the feed mains frequency $f1$, the two rotary stator fields reverse their direction of rotation, at the passage $f2=f1$ and the motor runs backwards. Driving and braking of the motor is effected over the same thyristors without any special control measures. If the motor frequency drops further, by varying the control frequency $f2$, to such an extent that the rotary stator fields of the motor rotate slower than the rotor, backfeed into the three-phase mains takes place forcibly and the motor is braked. This braking is possible up to the standstill. If the control frequency is again so far increased that the stator fields rotate faster than the rotor, the rotor is driven again.

In the above described embodiment, the star points of the system are formed by diode bridges and thyristors in the DC circuit. The solution is particularly simple since only six thyristors are required, so that the control expenditure remains low. But other combinations of thyristors or thyristors with diodes are also possible in order to form system star points. The number of three-phase systems is not limited to three. Solutions with only two systems or with more than three systems are also possible.

The diodes and thyristors can be installed in practice in the housing of the motor or they can be installed separate from the motor, depending on whether more emphasis is put on a compact construction or ready accessibility.

The control circuit arrangement for providing the necessary current pulses for firing the thyristor valve groups at the desired frequency $f2$, is not illustrated since it is conventional, and one suitable control arrangement is disclosed in Swiss Pat. No. 476,419 and also in British Pat. No. 1,170,203.

I claim:

1. A converter motor providing a stepless type of speed control which comprises a rotor, a pair of stators surrounding said rotor, each said stator including thereon a group of three-phase windings, said three-phase windings of each group having one end of each phase winding thereof connected with a corresponding phase of a three-phase network supplying alternating current at a frequency $f1$, the other end of each said phase winding being connected to a corresponding point intermediate the diodes of a three-phase diode bridge, each said bridge being provided with a controllable semiconductor valve which when in a conductive state serves to short circuit the bridge and form a star point connection for the said other ends of said phase windings thereby to establish an energization circuit for the appertaining three-phase winding and means rendering the controllable semiconductor valves for the diode bridges correlated to the three-phase windings of the two groups periodically conductive and nonconductive and in succession at a frequency $f2$ thereby to establish on said stators a combined rotary field which revolves at a speed equal to the difference between the frequencies $f1$ and $f2$ and which thereby determines the running speed of the rotor.

2. A converter motor as defined in claim 1 wherein said rotor is of the squirrel cage type.

3. A converter motor as defined in claim 1 wherein the controllable semiconductor valves correlated to the three-phase windings of each group are provided with quenching means by which each valve when rendered conductive in succession functions to quench the valve which had previously been in its conductive state.

4. A converter motor as defined in claim 3 wherein said quenching means for said controllable semiconductor valves of each group includes a commutation transformer provided with inductively coupled windings individual to and connected with each of the controllable valves, a quenching condenser included in the connections between each said transformer winding and the controllable valve correlated therewith, and a blocking choke connected in the circuit between the controllable valve and the diode bridge correlated therewith.

* * * * *